Apr. 24, 1923.
W. G. BRYAN
1,453,126
HUB BRAKE FOR MOTOR VEHICLES
Filed March 8, 1922
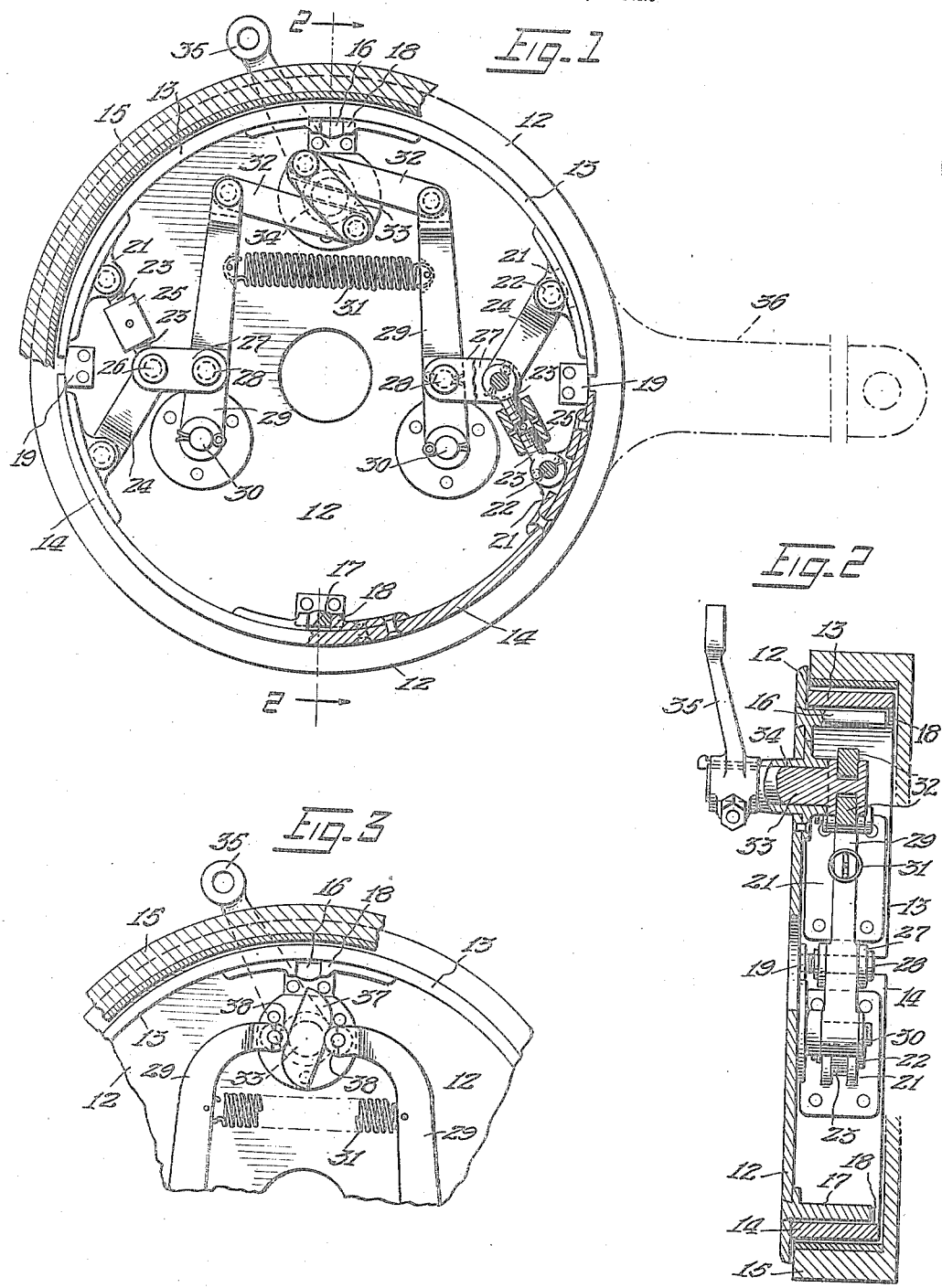
INVENTOR:
William G. Bryan
By Wm Wallace White
ATTY.

Patented Apr. 24, 1923.

1,453,126

UNITED STATES PATENT OFFICE.

WILLIAM GEORGE BRYAN, OF SYDNEY, NEW SOUTH WALES, AUSTRALIA, ASSIGNOR TO THOMAS STUART GURR AND PERCIVAL BERNARD SHEATHER, BOTH OF MOSMAN, NEAR SYDNEY, NEW SOUTH WALES, AUSTRALIA, AND CECIL ROY SWEETMAN, OF RANDWICK, NEAR SYDNEY, NEW SOUTH WALES, AUSTRALIA.

HUB BRAKE FOR MOTOR VEHICLES.

Application filed March 6, 1922. Serial No. 541,944.

*To all whom it may concern:*

Be it known that I, WILLIAM GEORGE BRYAN, a subject of the King of Great Britain and Ireland, residing at Sydney, New South Wales, Australia, have invented certain new and useful Improvements in Hub Brakes for Motor Vehicles, of which the following is a specification.

This invention relates to wheel hub brakes of the expanding sector type, and it consists in an improved assembly of pair toggles acting on two oppositely disposed brake shoe sectors, and intermediate levers co-acting with said toggles and controlled through hand or pedal lever linkage.

In the accompanying drawing,

Fig. 1 is a vertical sectional elevation of a brake according to the present invention;

Fig. 2 is a transverse vertical section on the line 2—2 of Fig. 1; and

Fig. 3 is a fragmentary sectional elevation showing the modified arrangement in which the intermediate levers are operated from the rock shaft by cams instead of toggles.

In Figs. 1 and 2—12 is a fixed disc or "head" on which the sector shoes 13 and 14 are carried and on which the linkage is mounted. This head is as usual immovably held by the axle casing structure so that it forms a fixed base to receive the thrust or drag of the brake. The sector shoes 13 and 14 are semi-circular and when spread apart by the linkage bear outwardly against the interior face of the rim portion 15 of the brake drum which is fixed to the wheel. 16 and 17 are guide studs fixed to the head 12, and 18 are guide stop lugs on the brake shoes which take against the sides of said studs 16 and 17 and transmit the drag of the brake through them to the head 12. 19 are stops fixed to the head 12 and located so that in the retired position the opposed ends of brake shoes 13 and 14 set back against them, and the faces of the shoes set clear of contact with the brake drum rim.

Near either end of it each brake shoe is fitted with a lug 21 drilled to carry a wrist pin 22. These pins 22 pivotally connect the outer ends of the toggle arms 23—23, 24—24 to the shoes 13 and 14 respectively. The toggle arms 23—23 are in sections connected by a left-and-right hand nut 25 forming a turnbuckle adjustment. The pairs of arms 23—24 are articulated through elbow pins 26 to links 27—27 which are pin jointed at 28 to the intermediate lever 29—29. Said levers are fulcrumed on studs 30—30 fixed in the head 12. 31 is a retiring spring set in tension and functioning to pull the power ends of the levers 29—29 inward. Said lever ends are connected by pivoted links 32—32 to the crank T arms on the rock spindle 33 which is rotatably mounted in a bushing 34 fixed on the head 12 and carries on its outer end the brake rigging lever 35. The extension arm 36 (shown dotted) is provided on the head 12 in the case of motor cycle equipments to provide an anchorage for the head to prevent its rotation by the drag of the brake.

In Fig. 3 a double cam 37 is fitted on the rock spindle 33 to act against anti-friction rollers 38—38 on the power ends of the intermediate levers to take the place of the crank-toggle arrangement shown in Figs. 1 and 2.

When the brake rigging is slack, the retiring springs 31 pulls the brake shoes clear of the brake drum rim and holds all the joints taut, with the shoes contacting with the stop checks 19, thereby preventing rattle. Adjustment for wear is provided by the turnbuckles 25. When the brake rigging is drawn taut, the spindle 33 is rocked, thereby through the toggle links 32 or the double cam 37 spreading the intermediate levers 29—29 and extending the toggles 23 and 24 and so forcing the sector shoes 13 and 14 apart into braking contact with the brake drum rim 15. In the reverse action, the spring 31 functions to retire the parts to the free position shown in the drawings.

What I claim as my invention and desire to secure by Letters Patent is:—

1. In a hub brake of the type wherein two diametrally movable sector shoes mounted on a fixed head frictionally engage the rim of a brake drum, a pair of toggles connecting the respective contiguous ends of said shoes, turnbuckle adjustments on said toggles, a pair of intermediate levers link-connected to the elbow joints of said toggles, a spring in tension adapted to retire said levers and so close said toggles, and a rock shaft controlled by a brake rigging lever and operatively connected through links with said intermediate levers.

2. A brake assembly comprising a fixed back plate forming a non-contacting closure with the open side of a brake drum, two oppositely disposed half sector shoes, stops on said shoes midway of their ends and diametrically opposite slide guides fixed on said plate for locating the shoes on the back plate, toggles acting between the contiguous ends of said shoes, a turnbuckle adjustment on one arm of each of said toggles, levers fulcrumed on said back plate and linked to the elbow joints of said toggles, a helical spring in tension connecting said levers, a rock shaft with T-head and a lever arm adapted to be engaged by brake rigging, a bushed bearing for said shaft fixed in said back plate, and means intermediate said levers and said T-head adapted for moving said levers obediently to the rotation of said T-head.

3. In a brake mechanism, the combination of a pair of expansible brake shoes, a pair of toggles connected to said shoes, one arm of each of said toggles comprising a turnbuckle device, means for operating said toggles to expand said shoes, and a spring acting upon the operating means for both of said toggles thereby to retire the same into inoperative position.

In testimony whereof I affix my signature.

WILLIAM GEORGE BRYAN.